United States Patent
Cheung (10) Patent No.: US 10,503,886 B2
(45) Date of Patent: Dec. 10, 2019

(54) BIOMETRIC AUTHENTICATION BASED ON GAIT PATTERN OR WRITING MOTION WITH AN INERTIAL MEASUREMENT UNIT

(71) Applicant: Hong Kong Baptist University, Hong Kong (HK)

(72) Inventor: Jeffrey Tai Kin Cheung, Hong Kong (HK)

(73) Assignee: Hong Kong Baptist University, Hong Kong (HK)

(*) Notice: Subject to any disclaimer, the term of this patent is extended or adjusted under 35 U.S.C. 154(b) by 137 days.

(21) Appl. No.: 15/709,474

(22) Filed: Sep. 20, 2017

(65) Prior Publication Data

US 2018/0089408 A1   Mar. 29, 2018

Related U.S. Application Data (60) Provisional application No. 62/400,098, filed on Sep. 27, 2016.

(51) Int. Cl.
| | | |
|---|---|---|
| G06F 21/32 | (2013.01) | |
| G06K 9/00 | (2006.01) | |
| G06F 21/62 | (2013.01) | |
| G06K 9/46 | (2006.01) | |

(52) U.S. Cl.
CPC ......... G06F 21/32 (2013.01); G06K 9/00348 (2013.01); *G06F 21/6218* (2013.01); *G06K 9/46* (2013.01)

(58) Field of Classification Search
CPC ........ G06F 21/32; G06F 21/31; G06F 21/316; G06K 9/00348
See application file for complete search history.

(56) References Cited

U.S. PATENT DOCUMENTS

| | | | | |
|---|---|---|---|---|
| 5,596,992 A | * | 1/1997 | Haaland | A61B 5/0086 250/339.01 |
| 2002/0111742 A1 | * | 8/2002 | Rocke | G06K 9/6267 702/19 |
| 2006/0279549 A1 | * | 12/2006 | Zhang | G06F 3/03545 345/173 |
| 2009/0074248 A1 | * | 3/2009 | Cohen | G06F 3/017 382/103 |
| 2011/0282828 A1 | * | 11/2011 | Precup | G06K 9/00348 706/54 |
| 2013/0204411 A1 | * | 8/2013 | Clark | A63B 71/0619 700/91 |

(Continued)

OTHER PUBLICATIONS

Cheng Bo et al., SilentSense: Silent User Identification Via Touch and Movement Behavioral Biometrics, Sep. 30-Oct. 4, 2013, ACM, pp. 187-190. (Year: 2013).*

(Continued)

*Primary Examiner* — Kari L Schmidt
*Assistant Examiner* — Fahimeh Mohammadi
(74) *Attorney, Agent, or Firm* — Idea Intellectual Limited; Margaret A. Burke; Sam T. Yip (57) ABSTRACT

The present invention relates to use an Inertial Measurement Unit (IMU) to record the acceleration trajectory of a person's gait or pen-less handwriting motion or any predesignated gestures, and to convert the data to a unique biometric pattern. The pattern is unique for each case and can be used as biometric security authentication.

12 Claims, 11 Drawing Sheets

(56) References Cited

U.S. PATENT DOCUMENTS

| | | | |
|---|---|---|---|
| 2015/0112603 A1* | 4/2015 | Zhong | G06K 9/46 |
| | | | 702/19 |
| 2015/0213244 A1* | 7/2015 | Lymberopoulos | G06F 21/32 |
| | | | 726/18 |
| 2015/0230734 A1* | 8/2015 | Cheung | A61B 5/1123 |
| | | | 702/141 |
| 2016/0192863 A1* | 7/2016 | Zhong | A61B 5/112 |
| | | | 600/595 |
| 2016/0241554 A1* | 8/2016 | Zizi | H04L 63/0861 |
| 2018/0078179 A1* | 3/2018 | Deng | A61B 5/117 |

OTHER PUBLICATIONS

Anuradha Annadhorai et al., Human Identification by Gait Analysis, Jun. 2008, ACM, pp. 1-3. (Year: 2008).*

Sebastijan Sprager et al., An Efficient HOS-Based Gait Authentication of Accelerometer Data, Mar. 23, 2015, IEEE, vol. 10, Issue: 7, pp. 1486-1498. (Year: 2015).*

Shuhei Terada et al., Performance of Gait Authentication Using an Acceleration Sensor, Oct. 13, 2011, IEEE, pp. 34-36. (Year: 2011).*

* cited by examiner

BIOMETRIC AUTHENTICATION BASED ON GAIT PATTERN OR WRITING MOTION WITH AN INERTIAL MEASUREMENT UNIT

CROSS-REFERENCE TO RELATED APPLICATIONS

This application claims priority from U.S. Provisional Patent Application Ser. No. 62/400,098 filed on Sep. 27, 2016, the disclosure of which is hereby incorporated by reference in its entirety.

FIELD OF THE INVENTION

The present invention relates to the use of an Inertial Measurement Unit (IMU) to record acceleration trajectory of a person's gait, pen-less handwriting motion or any predesignated gestures of a person, and conversion of the recorded data into biometric patterns. This unique pattern is used as a part of a biometric security authentication database. More particularly, it relates to a method of using an Inertial Measurement Unit (IMU) to record acceleration trajectory of a person's gait or pen-less handwriting motion or any predesignated gestures of a person for biometric security authentication.

BACKGROUND OF THE INVENTION

It has long been recognized that a person's gait and other predesignated gestures, such as pen-less writing, contain unique features that can be used as a secure and simple way for biometric authentication. Execution of biometric authentication can be divided into four steps: data collection, data conversion, data library and data matching according to the flow chart shown in FIG. 1. First, a method is chosen to record the time dependency of a motion in a particular parameter space, such as spatial displacement by image capture or acceleration along the three Cartesian axes with an IMU. The time dependency data is then transformed to a set of numerical representations of unique features of the individual.

Figure 1:
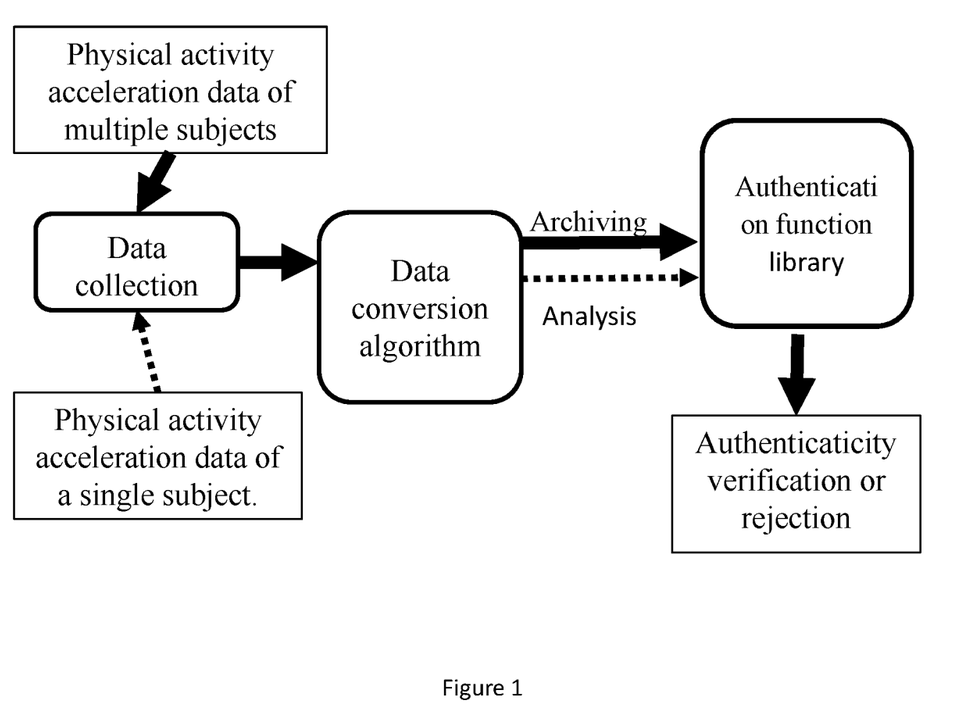
FIG. 1 shows the flow chart of a method of biometric authentication in accordance with the present invention.

Repetitive measurements under identical conditions produce a data set of a control group which is stored in a library. Subsequent measurement is then analyzed with the same algorithm and compared against the control group for authentication or rejection. While numerous studies have been reported in this area with different approaches in each phase of the process as shown in FIG. 1, there is a need to provide a more accurate means of biometric authentication.

SUMMARY OF THE INVENTION

The objective of this invention relates to use an Inertial Measurement Unit (IMU) to record acceleration trajectory of a person's gait or pen-less handwriting motion or any predesignated gestures, and conversion of the measured data to a unique pattern using a special algorithm. The present invention provides a method of biometric authentication comprising: using an IMU to record acceleration vectors along the three Cartesian axes during a specific repeated action, such as walking, writing, and any predesigned gestures. The data is then converted into a single time dependent authentication function S(t) that combines the characteristics of each coordinate component. The authentication function is unique for each individual and a particular motion, and is used as a biometric for security authentication. Magnitude of the authentication function, as it proceeds through a trajectory characteristic of an individual during each cycle of the repeated action, is converted into a single point in a multi-dimensional space. Data is collected from repetitive measurements taken under the same condition (e.g. the type of repeated action, duration of action and environment in which the action is performed) for each individual of a target population to produce a set of repetitive patterns which is stored in a database. Authentication function of each individual is aggregated into a closely spaced cluster in the multi-dimensional space. The set of repetitive patterns stored in the database is used as a control group for comparison with acceleration vectors of a test subject which is measured in the same way and converted to authentication function in the same way as the control group. Comparison based on Partial Least Square Discriminant Analysis determines authenticity verification or rejection. The comparison approach is applicable to any type of body movement including walking, running, physical activities performed under real pain or "faked pain", a predesignated gesture, and hand motion such as signature. High level of identification accuracy and high barrier to forgery discrimination has been demonstrated.

In a first aspect of the present invention, there is provided a method for biometric authentication based on a repeated movement, comprising:
obtaining, by at least one first inertia measurement sensor located on each individual of a subject group, time dependent measurements of magnitude of acceleration vectors, $x_{ori}(t)$, $y_{ori}(t)$ and $z_{ori}(t)$, in three Cartesian directions of said each individual of the subject group performing said repeated movement; computing, by a computer processor, an authentication function, S(t), for each individual of said subject group based on the acceleration vectors, wherein $$S(t)=[A_x(t)^2+A_y(t)^2+A_z(t)^2]^{1/2}$$

and $$A_x(t)=x_{ori}(t)-x_{off},$$

$$A_y(t)=y_{ori}(t)-y_{off},$$

$$A_z(t)=z_{ori}(t)-z_{off},$$

and $x_{off}$, $y_{off}$, and $z_{off}$ are zero offset values of each acceleration vector at the start of the respective measurements; analyzing S(t), by the computer processor, over at least two cycles of said repeated movement using multivariate analysis; storing on a computer readable storage medium the analyzed value of S(t) for each individual of said subject group as biometric identifiers in a database of biometric identifiers; obtaining, by at least one second inertia measurement sensor located on a test subject, time dependent measurements of magnitude of acceleration vectors, $x_{ori}(t)$, $y_{ori}(t)$, and $z_{ori}(t)$, in three Cartesian directions of said test subject performing said repeated movement; computing, by a computer processor, an authentication function, S(t), of said test subject based on the acceleration vectors; matching the S(t) of said test subject with the biometric identifiers of the subject group in the database of biometric identifiers using a Partial Least Square Discriminant Analysis; and authenticating said test subject.

In a second embodiment of the first aspect of the present invention, there is provided a method for biometric authentication based on a repeated movement wherein said repeated movement is hand writing.

In a third embodiment of the first aspect of the present invention, there is provided the method for biometric authentication based on a repeated movement wherein said repeated movement is walking.

In a fourth embodiment of the first aspect of the present invention, there is provided the method for biometric authentication based on a repeated movement wherein said repeated movement is running.

In a second aspect of the present invention, there is provided a non-transitory computer-readable medium comprising computer instructions for causing a computer processor to perform the method for biometric authentication based on a repeated movement.

In a second embodiment of the second aspect of the present invention, there is provided a non-transitory computer-readable medium comprising computer instructions for causing a computer processor to perform the method for biometric authentication based on a repeated movement wherein said repeated movement is hand writing.

In a third embodiment of the second aspect of the present invention, there is provided a non-transitory computer-readable medium comprising computer instructions for causing a computer processor to perform the method for biometric authentication based on a repeated movement wherein said repeated movement is walking.

In a fourth embodiment of the second aspect of the present invention, there is provided a non-transitory computer-readable medium comprising computer instructions for causing a computer processor to perform the method for biometric authentication based on a repeated movement wherein said repeated movement is running.

In a third aspect of the present invention, there is provided an apparatus for biometric authentication based on a repeated movement, comprising:

at least one first inertia measurement sensor located on each individual of a subject group configured to obtain time dependent measurements of magnitude of acceleration vector, $x_{ori}(t)$, $y_{ori}(t)$, and $z_{ori}(t)$, in three Cartesian directions of said each individual of said subject group performing said repeated movement;

a first computer processor configured to compute an authentication function, S(t), of said subject group based on the acceleration vectors, wherein $$S(t)=[A_x(t)^2+A_y(t)^2+A_z(t)^2]^{1/2}$$

and $$A_x(t)=x_{ori}(t)-x_{off},$$

$$A_y(t)=y_{ori}(t)-y_{off},$$

$$A_z(t)=z_{ori}(t)-z_{off},$$

and $x_{off}$, $y_{off}$, and $z_{off}$ are zero offset values of each acceleration vector at the start of the measurement; analyzing S(t), by the first computer processor, over at least two cycles of said repeated movement using multivariate analysis; a computer readable storage medium for storing the analyzed value of S(t) for each individual of said subject group as biometric identifiers in a database of biometric identifiers; at least one second inertia measurement sensor located on a test subject configured to obtain time dependent measurements of magnitude of acceleration vector along $x_{ori}(t)$, $y_{ori}(t)$ and $z_{ori}(t)$ directions and phase relationship of said test subject performing said repeated movement;

a second computer processor configured to:

compute an authentication function S(t) of said test subject based on the acceleration vectors; match the S(t) of said test subject with the biometric identifiers of the subject group in the database of biometric identifiers using a Partia Least Square Discriminant Analysis; and authenticate said test subject.

In a second embodiment of the third aspect of the present invention, there is provided an apparatus for biometric authentication based on a repeated movement wherein said repeated movement is hand writing.

In a third embodiment of the third aspect of the present invention, there is provided an apparatus for biometric authentication based on a repeated movement wherein said repeated movement is walking.

In a fourth embodiment of the third aspect of the present invention, there is provided an apparatus for biometric authentication based on a repeated movement wherein said repeated movement is running.

Citation or identification of any reference in this section or any other section of this application shall not be construed as an admission that such reference is available as prior art for the present application.

Those skilled in the art will appreciate that the invention described herein is susceptible to variations and modifications other than those specifically described.

The invention includes all such variation and modifications. The invention also includes all of the steps and features referred to or indicated in the specification, individually or collectively, and any and all combinations or any two or more of the steps or features.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the invention and apply throughout. Unless otherwise defined, all other technical terms used herein have the same meaning as commonly understood to one of ordinary skill in the art to which the invention belongs.

Other aspects and advantages of the invention will be apparent to those skilled in the art from a review of the ensuing description.

BRIEF DESCRIPTION OF THE DRAWINGS

The above and other objects and features of the present invention will become apparent from the following description of the invention, when taken in conjunction with the accompanying drawings, in which.

DETAILED DESCRIPTION OF THE INVENTION

The present invention is not to be limited in scope by any of the specific embodiments described herein. The following embodiments are presented for exemplification only.

Data Acquisition

A 3-axes accelerometer (i.e. IMU) that can be either a stand-alone unit or an embedded device in a smartphone is used for data collection to record acceleration vectors along the three Cartesian axes.

Figure 2:
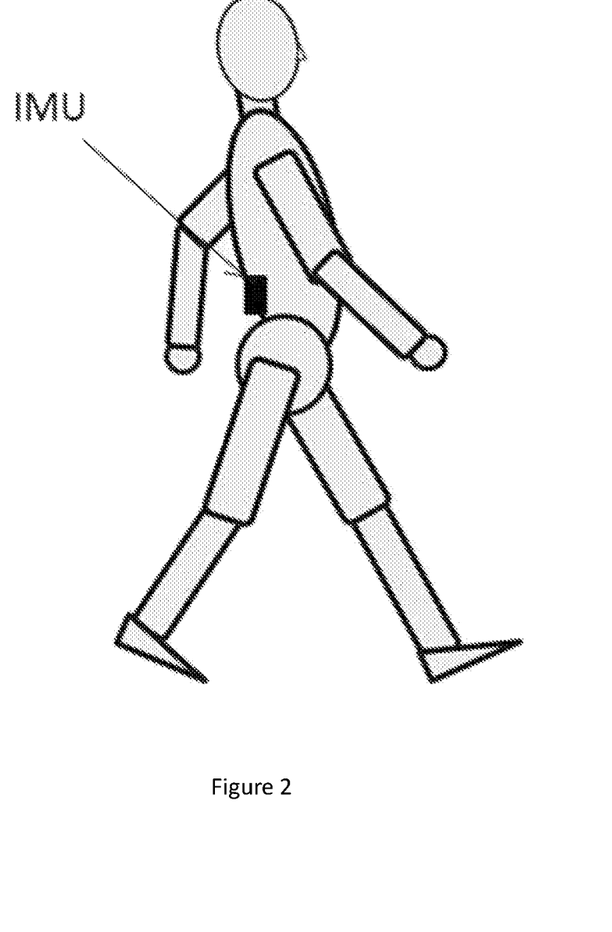
FIG. 2 shows one of the IMU placement locations in gait biometric authentication measurement.

For gait biometric authentication, a sensor is placed against lower back of an individual as shown in FIG. 2. The measured signals are then further filtered to remove noise. This procedure assures clean and reproducible data for detailed analysis.

Figure 3:
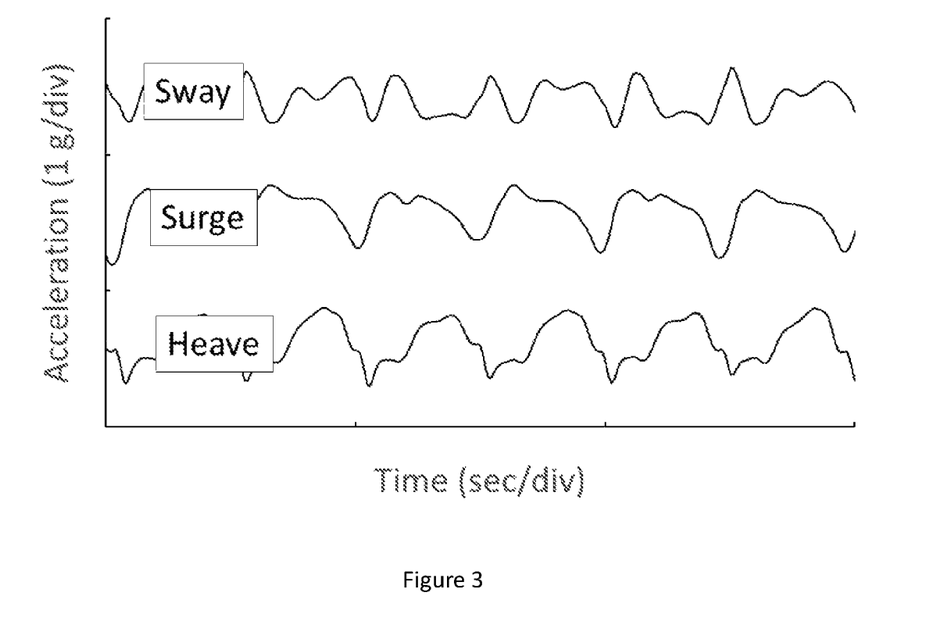
FIG. 3 shows acceleration data in three orthogonal coordinates of a person walking; the coordinates are designated as sway (sideway), surge (forward) and heave (vertical)
Figure 9:
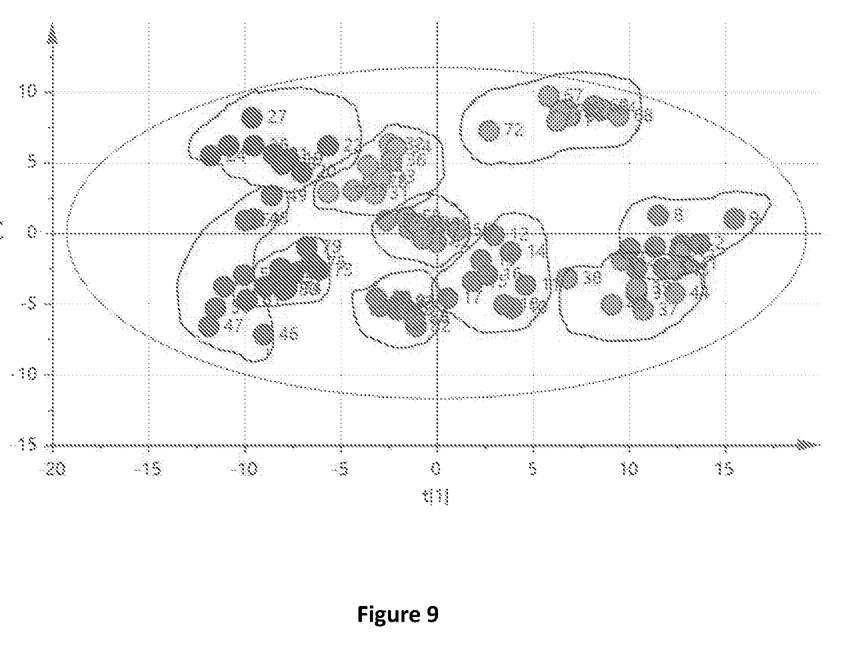
FIG. 9 shows gait authentication clusters of ten individuals in 2D space representation. Cluster of each individual is circled for clarity.
Figure 10:
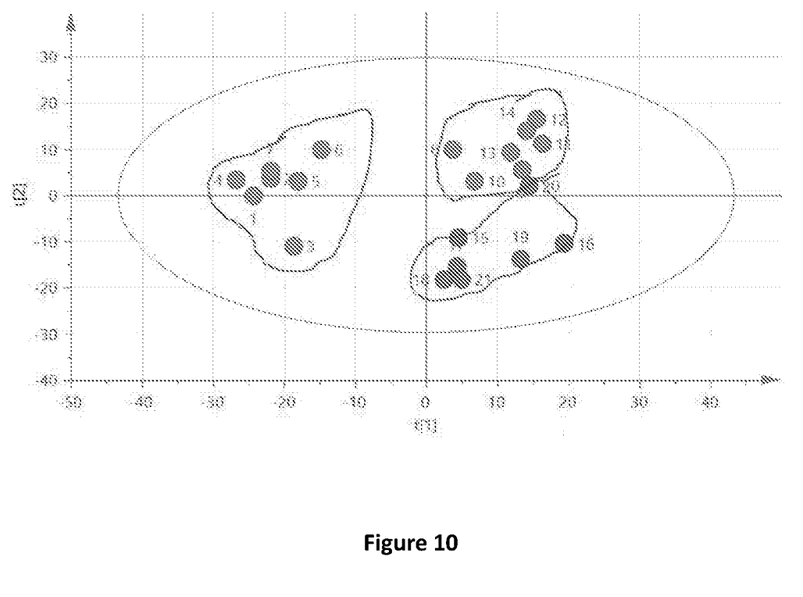
FIG. 10 shows authentication cluster of three individual's hand motion during writing in a 2D representation.

FIG. 3 shows the typical data taken for a person walking on a flat ground. It consists of three sets of oscillatory acceleration data in orthogonal directions: up and down (heave or vertical), side to side (sway or horizontal) and front and reverse (Surge or forward). The corresponding anatomical terms for these directions are: superior/Inferior, medial/lateral, and anterior/posterior respectively. Each individual walk for a number of strides under normal stance and pace. The gait data for each stride constitute a time dependent data set for the control group. Each individual of the control group data set that consists of acceleration data along three coordinates is converted to a single-valued time dependent function S(t), known as authentication function. Each authentication function can be divided evenly into N segments in the temporal domain. Thus, the magnitude of each segment can be represented as a value along the corresponding coordinate axis in the N-dimensional space. The entire authentication function is represented by N number of values or a single point in the N dimensional space. Gait biometric authentication cluster is a closely packed cluster in the N dimensional library formed from authentication function of strides under the same condition of the same individual and is shown in FIG. 9. Authentication function for pen-less writing are measured in the same way, where a sign or a group of characters can be considered as a complete cycle. FIG. 10 shows example of the pen-less hand writing biometric authentication clusters. In all these examples, the spaces have N=100 dimensions. However, due to limitation of visualization, such data can only be represented in 2D or 3D spaces. Authentication function values taken at different measurement times for the same individual form clusters that are closely packed as authentication acceptance. However, clusters formed by authentication function of different individuals are distinctive segregated and can be distinguished as authentication rejection.

Figure 4:
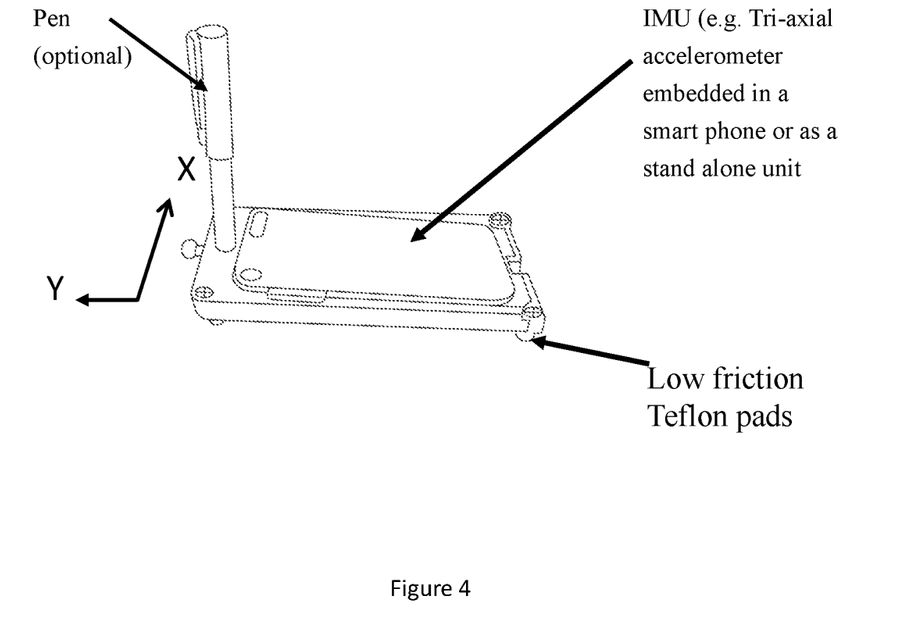
FIG. 4 shows a picture of a holder specifically designed to record acceleration during hand writing; a pen which is optional can be attached to record the pattern for reference.

FIG. 4 shows a holder specifically designed for recording hand motion during signing or drawing a predesignated pattern. A smart phone which is embedded with an IMU or a stand-alone IMU is placed face down on the holder. A pen is attached to the front of the holder. Since the pen is used to record the writing for record keeping and is not necessarily needed during application, it can be capped off or detached from the holder, leaving the holder flat against the writing surface. The contacts of the holder with the surface are made of Teflon or low friction materials for friction reduction so the motion will be smooth.

Due to the data conversion algorithm used in this invention, results are independent of the inclination angle.

Figure 5A:
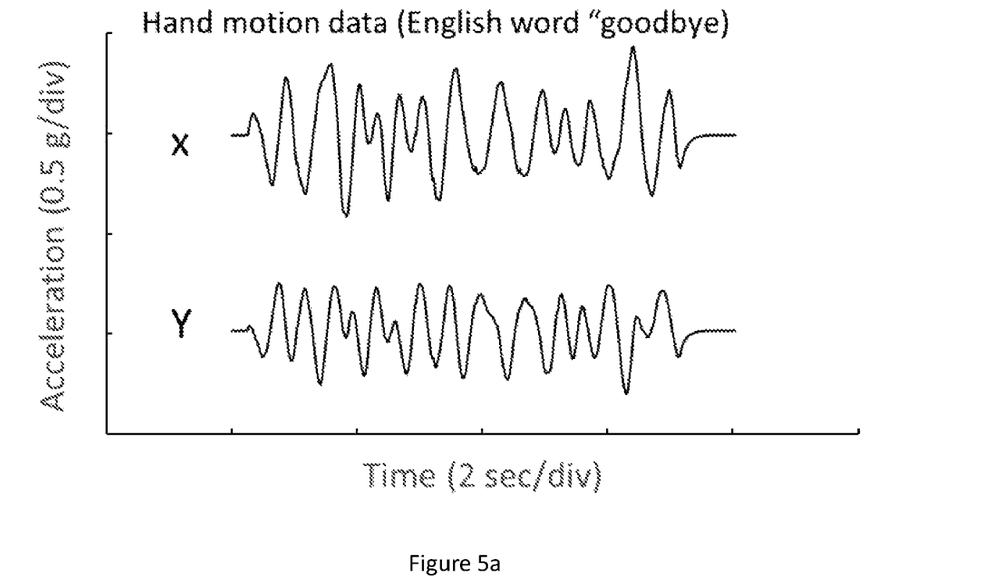
FIG. 5a shows raw data taken for biometric authentication based on hand motion in a 2D plane when writing the word "goodbye" in cursive form.
Figure 5B:
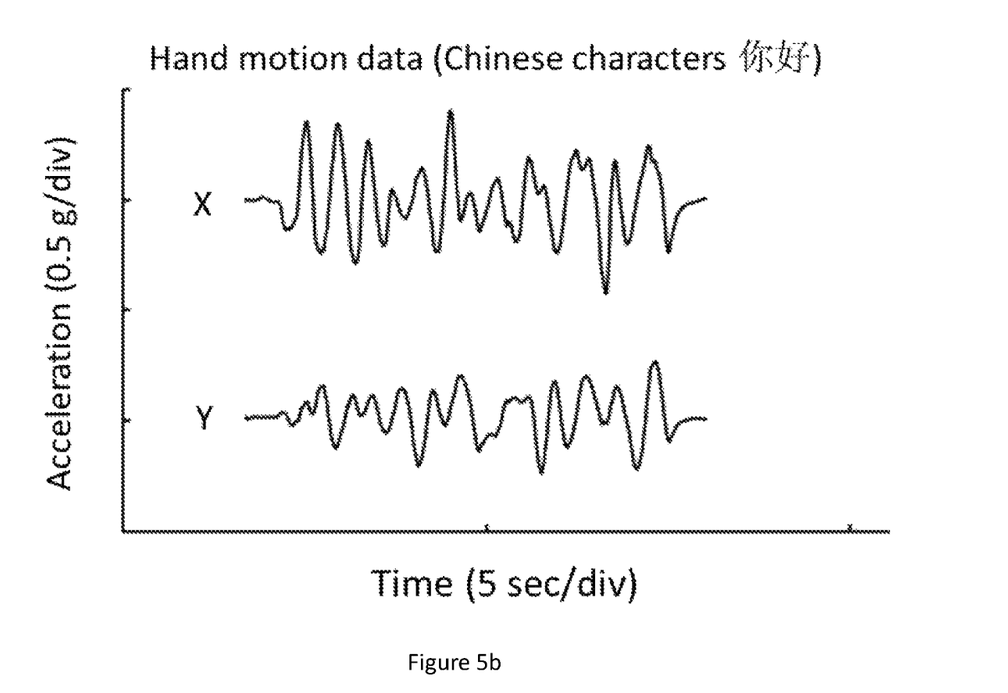
FIG. 5b shows raw data taken for biometric authentication based on hand motion in 2D plane when writing "How are you" in Chinese characters.

FIG. 3 shows the measured gait data of an individual. FIGS. 5a and 5b show the acceleration data of hand movement during writing the English word "goodbye" in cursive form and Chinese phrase "你好" (Nihao) characters, respectively. In this particular setting, the measurement is made for 2D movement in a plane. In both cases, the data rate is 100 Hz. With the IMU sensitivity of 0.003 g, where "g" is the gravitational constant, the accuracy in displacement measurement is less than 0.05 mm.

Gait authentication measurement is not limited to the placement of IMU against the lower back of an individual. The sensor can also be mounted on anywhere of the individual such as pockets, belt clip pouch and other mounting places as long as the data collection to build a library archive of a control group and the data collection for authentication share the same sensor placement location and method.

Data Reduction and Library Archive Data Base Development

1. Data Reduction

The original raw data that record accelerations in 3D or 2D form as $x_{ori}(t)$, $y_{ori}(t)$, $z_{ori}(t)$ are processed by a single time dependent function. The single time dependent function contains magnitude of acceleration vector along each direction and their phase relationship. At the start of the measurement, zero offset values, $x_{off}$, $y_{off}$, $z_{off}$, in all three directions are recorded and then are subtracted from the original raw data. The new data set appear as a set of functions in the transformed coordinate system:

$$A_x(t) = x_{ori}(t) - x_{off}$$

$$A_y(t) = y_{ori}(t) - y_{off}$$

$$A_z(t) = z_{ori}(t) - z_{off}$$

The magnitude of the vector S(t), known as authentication function, is calculated by:

$$S(t)=[A_x(t)^2+A_y(t)^2+A_z(t)^2]^{1/2}$$

S(t) contains both magnitude and phase of all Cartesian components and is used for data base archive as well as formatting new data for authentication. It should be noted that with this algorithm, the magnitude of the vector sum is invariant of the orientation of the initial coordinate system. Therefore, the results are not affected by the way the sensor is mounted as long as the motion does not involve axial rotation. The authentication function S(t) that consists of repetitive data of many cycles is analyzed by multivariate analysis with developed software or any commercial tool with this function. In a preferred embodiment, commercial software "SIMCA" by MKS Instruments is used.

Figure 6:
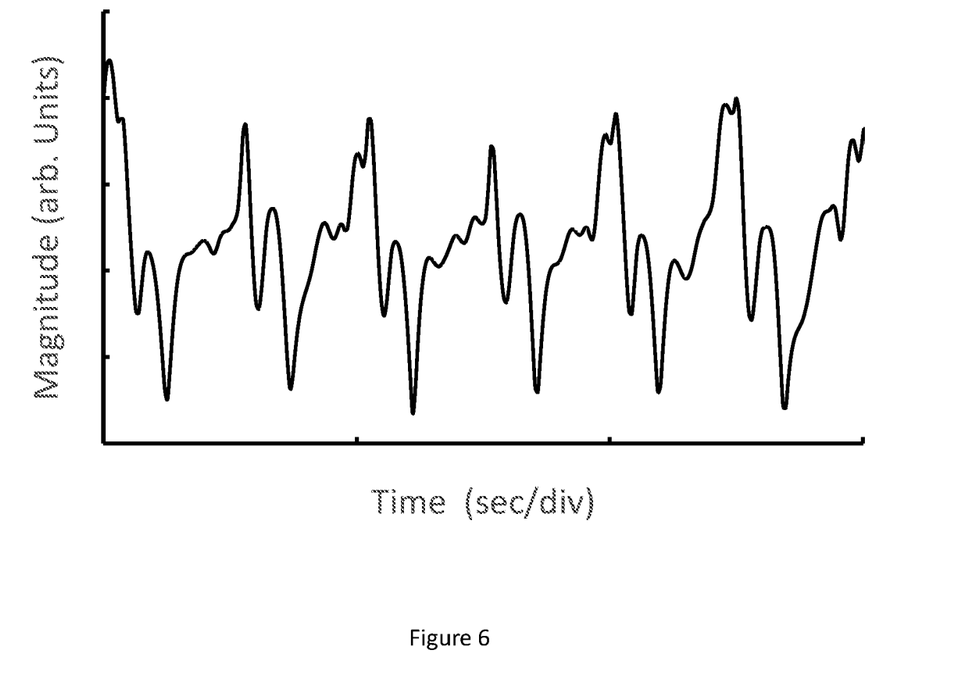
FIG. 6 shows conversion of the gait data from FIG. 3 to authentication function S(t)
Figure 7A:
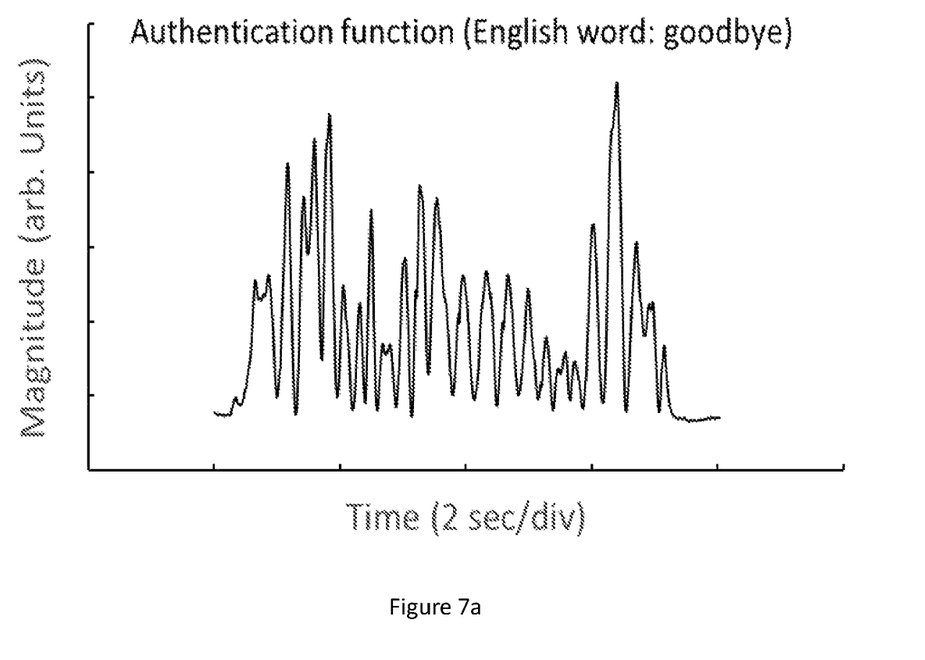
FIG. 7a s conversion of data from FIG. 5a to authentication functions S(t)
Figure 7B:
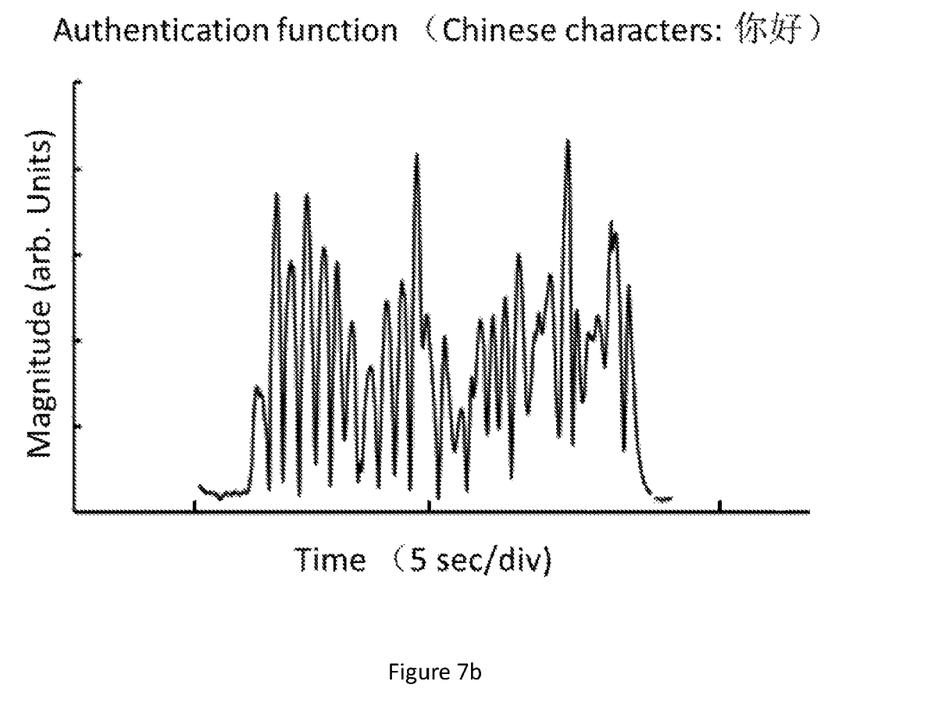
FIG. 7b shows conversion of data from FIG. 5b to authentication functions S(t)
Figure 8A:
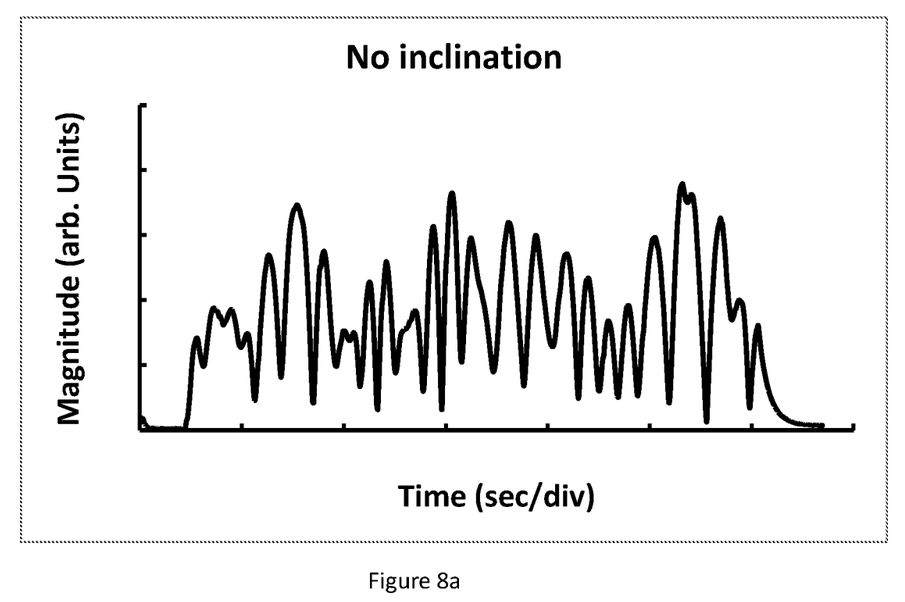
FIG. 8a shows authentication functions S(t) of data similar to FIG. 5 but written when the holder surface is leveled.
Figure 8B:
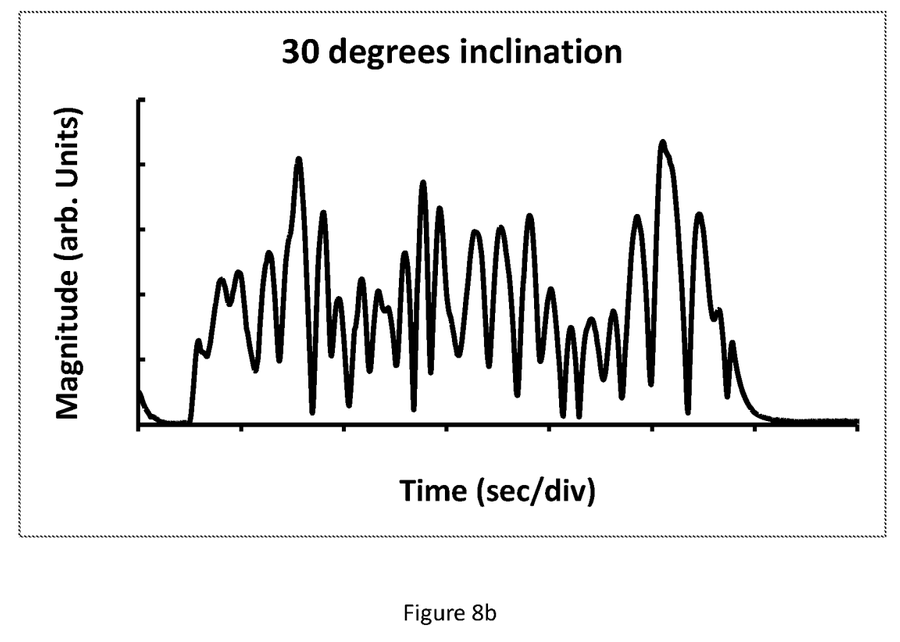
FIG. 8b shows authentication functions S(t) of data similar to FIG. 5 but written when the holder surface is inclined at 30 degrees.

The raw measurement of a person walking with three sets of accelerations along the orthogonal coordinates, as shown in FIG. 3, is converted to S(t) in repetitive cycles (FIG. 6). Similarly, the raw data of a person's handwriting of the word "goodbye" in cursive form and Chinese phrase "Nihao" (你好) in Chinese characters shown in FIGS. 5*a* and 5*b*, are transformed to their respective authentication function as depicted in FIG. 7. FIGS. 8*a* and 8*b* depict the authentication function S(t) of the same data as in FIGS. 5*a* and 5*b* except with the holder slanted at an angle of 30 degrees. Notice that the S(t) remains the same despite the different slanting angle.

2. Data Library

After the data is collected and transformed according to the algorithm described above, each data set is divided into equal segments for further analysis. For gait biometrics, the first few strides are discarded and only the strides after reaching steady state is used. Each stride represents one segment. For biometric based on hand writing or other gestures, the user is asked to repeat the motion a few times and each pattern is used as one authentication function. Each authentication function is then divided into N slices in the time domain. The choice of N depends on the resolution. Each slice can be equal or different as long as the data for authentication is sliced in the same way.

In this test, the inventor used N=100 and each slice has the same width in time. Each slice is assigned with an index i, where i=1, 2, . . . N, and corresponding value for each slice is $S(t_i)$. Therefore, a segment is represented by a single point $S(t_{i=1,2,3,...N})$ in an N-dimensional space. When the features of the samples are sufficiently similar, these values form a cluster in a closely packed proximity. FIG. 9 shows the gait biometrics of several individuals in a 3D-representation. It clearly shows non-overlapping clusters corresponding to different individuals. In reality, the space has N dimensions (in this case N=100), therefore the separation between each cluster is even more prominent. The library stores a large number of clusters for individuals which is used for authentication.

3. Identity Authentication

Authentication is based on the data collected from a test individual performing a specific task such as walking or writing under the same condition as that used in collecting a control group data stored in the library. After the onset of walking, the gait takes a few steps to develop into a steady form. For gait based biometric authentication, it is found that authentication based on second stride gives a 20% error and for the third stride, a less than 5% error. The error reduces as the gait approaches a steady state. Therefore, the test individual must walk for a few strides until a steady state is reached for high authentication accuracy. After data of the test individual is collected, the test data is processed with the same algorithm used to build the control archive. The test data is then processed by a software based on Partial Least Square Discriminant Analysis to search and match against control data stored in the archive for authentication acceptance or rejection.

To test the validity of gait biometric authentication of the present invention, the gait data from 10 individuals of different gender and age walking in normal pace are collected. The data are processed and stored in the library archive in the computer for future reference. At a different time, one of the individual from the archive group is subjected to gait measurement under the same condition as before for data authentication. The time between collecting the archived data and collecting the data for authentication varies from a few days to a few months. The data of the first four strides and the last four strides are discarded. Two strides from the steady state are taken from test individual for authentication. With this setup, the present invention has achieved 100% authentication matching and zero case of rejection. Additionally, gait of a test individual who is not on the archive group is tested, the result is rejected since the computer is unable to find any match.

Authentication of writing style is also tested by the same algorithm. In this case, only writing motion in 2D space without rotation is considered. Two sets of writings, an English word "goodbye" and a Chinese character phrase "Nihao 你好" both in cursive form, are tested for 7 individuals. The library archive is based on 7 repetitive writings of the same word or phrase. The time between collecting the archived data and collecting the data for authentication varies from a few days to a few weeks. Again, the results demonstrated 100% matching.

4. Identity Forgery Proof

Figure 11:
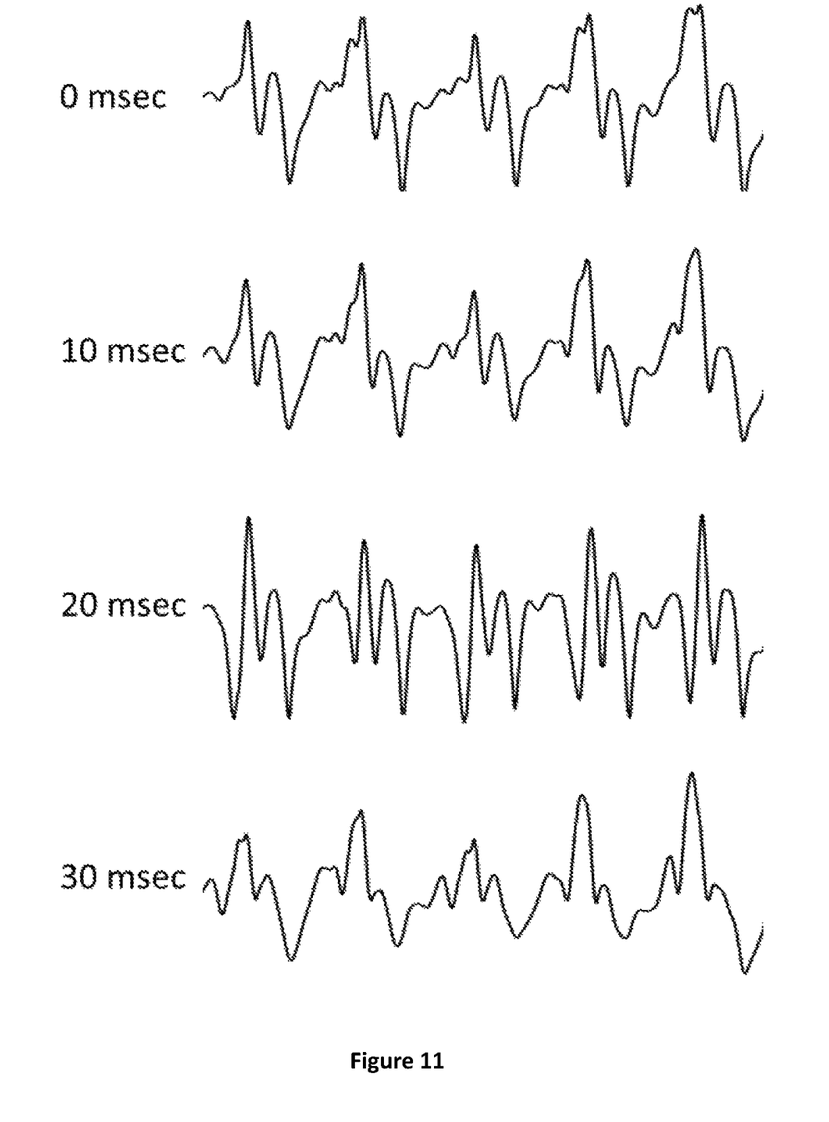
FIG. 11 shows change of authentication function of a gait measurement due to phase shift of sway motion with respect to other two motions; the shift is measured in msec (i.e. 0.001 seconds).

To further validate the usefulness and robustness of the present invention, studies are carried out to investigate security of the present invention against forgery. For gait biometric signature, the phase of each Cartesian component is shifted in both positive and negative directions with respect to the other two components and the result is checked for authentication by Partial Least Square Discriminant Analysis with following findings:

1) Among the accelerations along three Cartesian coordinates, surge motion is the least sensitive and sway motion is the most sensitive followed by heave motion. For Surge movement, the gait can tolerate as much as 75 msec shift without rejection in the authentication.
2) The maximum tolerance in phase shift of the Heave movement is 20 msec without rejection in authentication. The most sensitive component characterizing a person's gait identity is the Sway motion. The tolerance level to maintain authentication is less than 10 msec phase shift in both positive and negative directions. FIG. 11 shows the difference between authentication patterns of two gait measurement with 10, 20 and 30 msec shift in Sway acceleration. Since the motion of writing invokes acceleration in all three directions, authentication is determined by the motion with the least phases shift sensitivity tolerance. In other words, for authentication based on gait, it is the sway motion and any phase shift greater than 10 msec will result in rejection.

Similar findings are made on the effect of phase shift of acceleration in either axis on the effect of authentication based on hand motion in 2D writing.

The embodiments disclosed herein may be implemented using general purpose or specialized computing devices, computer processors, microcontrollers, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

INDUSTRIAL APPLICABILITY

The present invention discloses the use of an IMU to record the acceleration trajectory of a person's gait or pen-less handwriting motion or any predesignated gestures, and to convert the data to a unique pattern with a special algorithm. More particularly, it relates to a method of using an IMU to record the acceleration trajectory of a person's gait or pen-less handwriting motion or any predesignated gestures for biometric security authentication.

If desired, the different functions discussed herein may be performed in a different order and/or concurrently with each other. Furthermore, if desired, one or more of the above-described functions may be optional or may be combined.

While the foregoing invention has been described with respect to various embodiments and examples, it is understood that other embodiments are within the scope of the present invention as expressed in the following claims and their equivalents. Moreover, the above specific examples are to be construed as merely illustrative, and not limitative of the reminder of the disclosure in any way whatsoever. Without further elaboration, it is believed that one skilled in the art can, based on the description herein, utilize the present invention to its fullest extent. All publications recited herein are hereby incorporated by reference in their entirety.

What is claimed is:

1. A method for biometric authentication based on a repeated movement, comprising:
obtaining, by at least one first inertia measurement sensor located on each individual of a subject group, time dependent measurements of magnitude of acceleration vectors, $x_{ori}(t)$, $y_{ori}(t)$, and $z_{ori}(t)$, in three Cartesian directions of said each individual of the subject group performing said repeated movement;
computing, by a computer processor, an authentication function, S(t), for each individual of said subject group based on the acceleration vectors, wherein $$S(t)=[A_x(t)^2+A_y(t)^2+A_z(t)^2]^{1/2}$$

and $$A_x(t)=x_{ori}(t)-x_{off},$$

$$A_y(t)=y_{ori}(t)-y_{off},$$

$$A_z(t)=z_{ori}(t)-z_{off},$$

and $x_{off}$, $y_{off}$, and $z_{off}$ are zero offset values of each acceleration vector at the start of the respective measurements and where the magnitude of the authentication function, S(t), as it proceeds through a trajectory characteristic of an individual during each cycle of the repeated movement, is converted into a single point in a multi-dimensional space;
analyzing S(t), by the computer processor, over at least two cycles of said repeated movement using multivariate analysis to create an analyzed, reference S(t);
storing on a computer readable storage medium the analyzed, reference S(t) for each individual to create stored, analyzed reference values S(t) of said subject group as biometric identifiers in a database of biometric identifiers;
obtaining, by at least one second inertia measurement sensor located on a test subject, time dependent measurements of magnitude of acceleration vectors, $x_{ori}(t)$, $y_{ori}(t)$, and $z_{ori}(t)$, in three Cartesian directions of said test subject performing said repeated movement;
computing, by a computer processor, a test subject authentication function, S'(t), of said test subject based on the acceleration vectors;
comparing the stored, analyzed reference values of S(t) for the subject group with the test subject authentication function S'(t);
matching the stored, analyzed reference values of S(t) of said test subject with the test subject authentication function S'(t) as the biometric identifiers of the subject group in the database of biometric identifiers using a Partia Least Squares Discriminant Analysis; and
authenticating said test subject if the test subject authentication function S'(t) is within a predetermined tolerance level of one or more stored, analyzed reference values of S(t) and wherein authentication is determined by a motion component of the movement with least phase shift sensitivity tolerance.

2. The method according to claim 1 wherein said repeated movement is hand writing.

3. The method according to claim 1 wherein said repeated movement is walking.

4. The method according to claim 1 wherein said repeated movement is running.

5. A non-transitory computer-readable medium comprising computer instructions for causing a computer processor to
obtain, by at least one first inertia measurement sensor located on each individual of a subject group, time dependent measurements of magnitude of acceleration vectors, $x_{ori}(t)$, $y_{ori}(t)$, and $z_{ori}(t)$, in three Cartesian directions of said each individual of the subject group performing said repeated movement;

compute an authentication function, S(t), for each individual of said subject group based on the acceleration vectors, wherein $$S(t)=[A_x(t)^2+A_y(t)^2+A_z(t)^2]^{1/2}$$

and $$A_x(t)=x_{ori}(t)-x_{off},$$

$$A_y(t)=y_{ori}(t)-y_{off},$$

$$A_z(t)=z_{ori}(t)-z_{off},$$

and $x_{off}$, $y_{off}$, and $z_{off}$ are zero offset values of each acceleration vector at the start of the respective measurements and where the magnitude of the authentication function, S(t), as it proceeds through a trajectory characteristic of an individual during each cycle of the repeated movement, is converted into a single point in a multi-dimensional space;

analyze S(t) over at least two cycles of said repeated movement using multivariate analysis to create an analyzed, reference S(t);

store the analyzed, reference S(t) for each individual to create stored, analyzed reference values S(t) of said subject group as biometric identifiers in a database of biometric identifiers;

obtain, by at least one second inertia measurement sensor located on a test subject, time dependent measurements of magnitude of acceleration vectors, $x_{ori}(t)$, $y_{ori}(t)$, and $z_{ori}(t)$, in three Cartesian directions of said test subject performing said repeated movement;

compute a test subject authentication function, S'(t), of said test subject based on the acceleration vectors;

compare the stored, analyzed reference values of S(t) for the subject group with the test subject authentication function S'(t);

match the stored, analyzed reference values of S(t) of said test subject with the test subject authentication function S'(t) as the biometric identifiers of the subject group in the database of biometric identifiers using a Partia Least Squares Discriminant Analysis; and authenticate said test subject if the test subject authentication function S'(t) is within a predetermined tolerance level of one or more stored, analyzed reference values of S(t) and wherein authentication is determined by a motion component of the movement with least phase shift sensitivity tolerance.

6. The non-transitory computer-readable medium according to claim 5, wherein the repeated movement is hand writing.

7. The non-transitory computer-readable medium according to claim 5, wherein the repeated movement is walking.

8. The non-transitory computer-readable medium according to claim 5, wherein the repeated movement is running.

9. An apparatus for biometric authentication based on a repeated movement, comprising:

at least one first inertia measurement sensor located on each individual of a subject group configured to obtain time dependent measurements of magnitude of acceleration vector, $x_{ori}(t)$, $y_{ori}(t)$, and $z_{ori}(t)$, in three Cartesian directions of said each individual of said subject group performing said repeated movement;

a first computer processor configured to compute an authentication function, S(t), of said subject group based on the acceleration vectors, wherein $$S(t)=[A_x(t)^2+A_y(t)^2+A_z(t)^2]^{1/2}$$

and $$A_x(t)=x_{ori}(t)-x_{off},$$

$$A_y(t)=y_{ori}(t)-y_{off},$$

$$A_z(t)=z_{ori}(t)-z_{off},$$

and $x_{off}$, $y_{off}$, and $z_{off}$ are zero offset values of each acceleration vector at the start of the measurement and where the magnitude of the authentication function, S(t), as it proceeds through a trajectory characteristic of an individual during each cycle of the repeated movement, is converted into a single point in a multi-dimensional space;

analyzing S(t), by the first computer processor, over at least two cycles of said repeated movement using multivariate analysis to create an analyzed, reference S(t);

a computer readable storage medium for storing the analyzed reference S(t) for each individual of said subject group as biometric identifiers in a database of biometric identifiers;

at least one second inertia measurement sensor located on a test subject configured to obtain time dependent measurements of magnitude of acceleration vector along $x_{ori}(t)$, $y_{ori}(t)$, and $z_{ori}(t)$ directions and phase relationship of said test subject performing said repeated movement;

a second computer processor configured to:

compute a test subject authentication function S'(t) of said test subject based on the acceleration vectors;

compare the stored, analyzed reference values of S(t) for the subject group with the test subject authentication function S'(t);

match the stored, analyzed reference S(t) of said test subject with the test subject authentication function S'(t) as the biometric identifiers of the subject group in the database of biometric identifiers using a Partia Least Squares Discriminant Analysis; and authenticate said test subject if the test subject authentication function S'(t) is within a predetermined tolerance level of one or more stored, analyzed reference values of S(t) and wherein authentication is determined by a motion component of the movement with least phase shift sensitivity tolerance.

10. The apparatus according to claim 9 wherein said repeated movement is hand writing.

11. The apparatus according to claim 9 wherein said repeated movement is walking.

12. The apparatus according to claim 9 wherein said repeated movement is running.

* * * * *